US00RE36023E

United States Patent [19]

Koenig

[11] E Patent Number: Re. 36,023

[45] Reissued Date of Patent: Jan. 5, 1999

[54] TAPERED AUGER SHREDDER

[76] Inventor: Larry E. Koenig, c/o Komar Industries, Inc. 4425 Marketing Pl., Groveport, Ohio 43125

[21] Appl. No.: 454,520

[22] Filed: Mar. 30, 1995

Related U.S. Patent Documents

Reissue of:

[64] Patent No.: 5,108,040
Issued: Apr. 28, 1992
Appl. No.: 576,091
Filed: Aug. 28, 1990

U.S. Applications:

[63] Continuation of Ser. No. 53,142, Apr. 27, 1993, abandoned, which is a continuation of Ser. No. 345,157, Apr. 28, 1989, abandoned.

[51] Int. Cl.[6] ..... B02C 18/40

[52] U.S. Cl. ..... 241/260.1; 175/394; 100/145

[58] Field of Search ..... 241/260.1; 198/677; 366/79, 82, 88, 89, 266, 318, 323; 100/145; 299/55; 175/323, 394; 56/DIG. 1; 37/81; 415/81, 71, 72, 75

[56] References Cited

U.S. PATENT DOCUMENTS

| | | | |
|---|---|---|---|
| 86,400 | 2/1869 | Horton | 175/394 X |
| 669,340 | 3/1901 | Fyfe | 175/394 X |
| 1,202,928 | 10/1916 | Wallace | 175/394 |
| 1,859,717 | 5/1932 | Rutrle | 175/394 X |
| 2,920,878 | 1/1960 | Kandle | 175/394 X |
| 3,812,985 | 5/1974 | Lindeborg et al. . | |
| 4,256,035 | 3/1981 | Neufeldt . | |
| 4,304,539 | 12/1981 | Hagiwara et al. . | |
| 4,329,313 | 5/1982 | Miller et al. . | |
| 4,519,496 | 5/1985 | Ludvigsen . | |
| 4,623,025 | 11/1986 | Verstraeten | 175/394 X |
| 4,807,816 | 2/1989 | Ataka . | |
| 4,917,196 | 4/1990 | Stiffler et al. | 175/394 X |

FOREIGN PATENT DOCUMENTS

| | | |
|---|---|---|
| 2555100 | 11/1983 | France . |
| 625549 | 2/1936 | Germany . |
| 2506042 | 2/1975 | Germany . |
| WO880420 | 6/1988 | WIPO . |

*Primary Examiner*—Joseph M. Gorski
*Attorney, Agent, or Firm*—Thompson Hine & Flory LLP

[57] ABSTRACT

A tapered auger shredder which includes a frame defining a grinding chamber with a front wall having a centrally-located discharge opening and a rear wall mounting a powered auger screw having a flighted shaft extending through the chamber and into the discharge opening. The auger screw and shaft are tapered and the screw flight is correspondingly tapered so that the volume pumped by the screw along the length of the shaft remains substantially constant, or the rate of compression is substantially reduced, to provide consistent flow of material to the discharge opening and reduce build up of material against the front wall. In a preferred embodiment, the screw includes a torque transmission collar which extends between a disc-shaped base plate supporting the screw and the first flight turn and acts to prevent jamming of material between the base plate and underside of the first turn as well as transmit rotational torque from the disc to the shaft and flight.

27 Claims, 2 Drawing Sheets

TAPERED AUGER SHREDDER

Matter enclosed in heavy brackets [ ] appears in the original patent but forms no part of this reissue specification; matter printed in italics indicates the additions made by reissue.

This is a [continuation] *CONTINUATION* [application] of [co-pending] application Ser. No. [345,157,] *08/053,142,* filed Apr. [8, 1989] *27, 1993, and* now abandoned, *which is a reissue of application Ser. No. 07/576,091, filed Aug. 28, 1990, and now U.S. Pat. No. 5,108,040, which in turn is a continuation of application Ser. No. 07/345,157, filed Apr. 28, 1989, and now abandoned.*

BACKGROUND OF THE INVENTION

The present invention relates to auger shredding devices and, more particularly, to auger shredding devices utilizing a tapered screw in a side discharge grinding chamber.

In order to crush and shred large, rigid objects such as wooden pallets, crates, utility poles, railroad ties, 55-gallon oil drums of concrete and the like, it is necessary to utilize a heavy duty device which typically includes one or more rotating augers within a grinding chamber shaped to conform to the auger flight. An example of such device is disclosed in Koenig U.S. Pat. No. 4,253,615. That device includes a grinding chamber within which is rotatably mounted a single auger having a cylindrical shaft and a tapered flight. The front wall of the chamber includes a centrally-located discharge opening which is coaxial with the rotational axis of the auger and the top of the grinding chamber is open to receive material to be crushed and shredded.

In operation, material deposited into the grinding chamber is pulled downwardly by teeth projecting from the periphery or the auger night and is crushed and shredded by the interaction of the auger flight with the grinding chamber walls, as well as meshing action of the auger teeth with breaker bars mounted on the grinding chamber walls.

Since the auger flight is tapered and is supported on a cylindrical shaft, the volume defined by the auger flight and outer shaft surface—the pumping volume—decreases along the length of the auger to the discharge opening. Accordingly, material which is crushed and shredded is at the same time compressed as it progresses along the grinding chamber to the discharge opening.

A similar device is disclosed in Worthington U.S. Pat. No. 4,227,849. That device is a garbage compactor which is attachable to a garbage truck and includes a conical chamber which houses a powered auger having a cylindrical shaft and a tapered flight. The auger projects the length of the housing and extends outwardly beyond the discharge opening.

The top of the housing is open to receive residential refuse and the refuse is broken up and compressed as it is pumped by the rotating auger along the housing. With both the Worthington and Koenig devices, material is compressed by a tapered auger as it is pumped along the grinding chamber or housing to a discharge opening.

A disadvantage with these designs is that the compression of pumped material may, in some instances, cause jamming of the auger. In addition, a buildup of material at the front wall may result from the overcompression of material by the tapered flight, causing clogging of the discharge opening.

Another disadvantage of the aforementioned devices is that material often jams behind the first turn of the auger flight. The space beneath the first turn of the auger flight typically forms a wedge-shaped void with a disc-shaped auger mounting plate or rear wall of the grinding chamber which supports the auger shaft. When material is fed downwardly into the grinding chamber and is broken up, there is a tendency for material to enter that wedge-shaped void and build up. Accordingly, it is necessary to stop rotation of the auger and remove material from the space.

Another disadvantage with present designs is that torque transmitted from the auger motor to the auger flights must pass substantially entirely through the auger shaft, which places a strain on the weldments or other connections between the shaft and flight. With large diameter flights, a large shear stress is placed on the connection between the flight and shaft, resulting in failure of the weldment or connection in high torque operating situations. One solution to this problem is to increase the diameter of the shaft. However, such a solution is costly, greatly adds to the overall weight of the device, and reduces the volume of usable space within a grinding chamber of given dimensions.

Accordingly, there is a need for an auger shredder which provides an even and consistent flow of material along the grinding chamber to the discharge opening. There is also a need for an auger shredder in which the auger is capable of withstanding high torque loads with a minimum shaft diameter.

SUMMARY OF THE INVENTION

The present invention is an auger shredder which is capable of crushing and shredding large scale items such as wood pallets, wood crates, railroad ties, utility poles, washing machines and the like, and includes an auger which is capable of pumping the crushed and shredded material in an even and consistent manner to a discharge opening. The auger shredder includes a frame defining a grinding chamber having a front wall with a centrally-located discharge opening, and an auger, rotatably mounted on a rear wall, which includes a flighted shaft extending the length of the grinding chamber and into the discharge opening.

In a preferred embodiment, the flight is tapered from the base to the tip of the shaft, and the shaft is correspondingly tapered so that the pumping volume defined by the shaft and flight is substantially constant along the length of the grinding chamber. As a result, the compression that normally occurs with tapered augers is greatly reduced, which results in a more even and consistent flow of crushed and shredded material to the discharge opening.

The auger shredder includes an extrusion tube which extends outwardly from the front wall and communicates with the discharge opening. An outer segment of the auger extends into the extrusion tube and the pumping volume defined by the flights and shaft of that outer segment is reduced from the pumping volume of the remainder of the auger. As a result, once material has entered the extrusion tube, it is compressed at a greater rate and forms a plug of material within the extrusion tube. This plug of material is acted upon by the leading edge of the auger flight, which further reduces the particle size of the crushed and shredded material.

Also in the preferred embodiment, the auger includes a disc-shaped base plate which is driven by a hydraulic motor and supports the auger shaft, and a torque transmission collar which extends from the base plate to the underside of the first flight of the auger. To obtain the greatest mechanical advantage, the torque transmission collar is spaced from the axis of rotation a maximum distance so that it is adjacent to the periphery of the base plate. The collar is made sufficiently strong such that torsional forces exceeding one percent and not more than approximately 15 percent of the total load are transmitted from the base plate to the auger. As a result of this design, the auger shaft can be reduced in diameter, which provides more room within a given grinding chamber, and reduces the buildup of material beneath the first turn of the auger flight.

Accordingly, it is an object of the present invention to provide an auger shredder for shredding and crushing large, rigid objects in a smooth and efficient manner and preventing a buildup of material on the front wall of the grinding chamber surrounding the discharge opening: an auger shredder in which the pumping volume is maintained substantially constant along the length of the auger through the grinding chamber; an auger shredder in which the pumping volume is decreased within an extrusion tube to compress and reduce particles further; an auger shredder which can withstand high torsional loads and shear stresses with a relatively small diameter shaft; and an auger shredder which requires relatively low maintenance and is relatively simple to construct.

Other objects and advantages will be apparent from the following description, the accompanying drawings and the appended claims.

DETAILED DESCRIPTION OF THE PREFERRED EMBODIMENT

Figure 1:
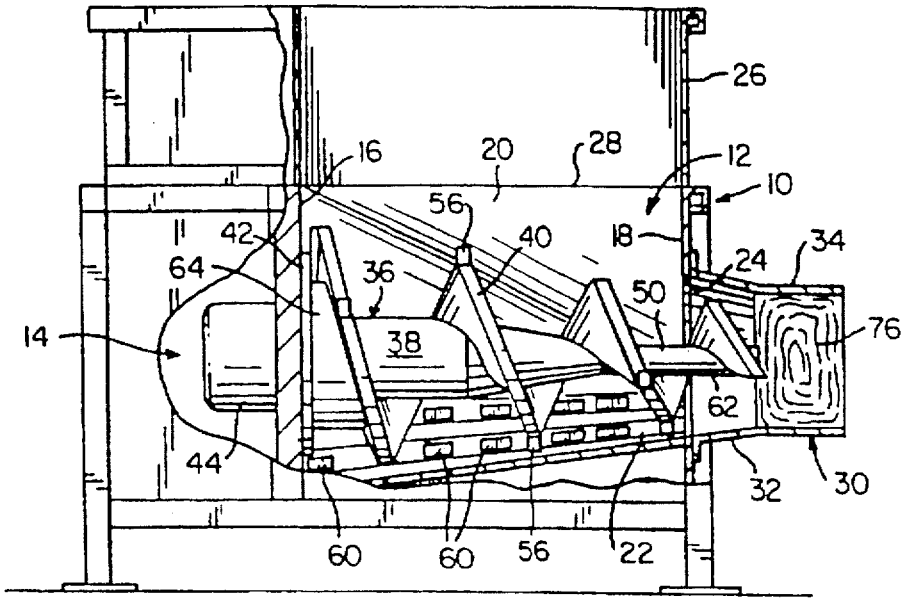
FIG. 1 is a side elevation, partially broken away, of a preferred embodiment of the tapered auger shredder of the present invention.

As shown in FIG. 1, the tapered auger shredder of the present invention includes a frame, generally designated 10, which defines a grinding chamber 12 and motor housing 14. The grinding chamber 12 includes rear wall 16, front wall 18 and downwardly converging side walls 20 (only one of which is shown in FIG. 1). The side walls 20 include arcuate portions which meet to form a semicircular trough 22. The front wall 18 includes a centrally-positioned discharge opening 24 and the trough 22 is sloped upwardly from the rear wall to the discharge opening. The top of the grinding chamber is open and a hopper extension 26 is attached to the frame 10 to surround the grinding chamber opening 28.

An extrusion tube 30 is mounted on the exterior surface of the front wall 18. The extrusion tube 30 includes a conical segment 32, which communicates with the discharge opening 24, and a cylindrical segment 34 which extends outwardly from the conical segment.

An auger screw, generally designated 36, is rotatably mounted within the grinding chamber 12 on the rear wall 16. The auger screw includes a shaft 38, a flight 40 supported on the shaft and a disc-shaped base plate 42. A hydraulic drive motor 44 is mounted on the rear surface of the rear wall 16 and rotates the auger 36. A source of high pressure hydraulic fluid (not shown) is also contained within the motor housing, along with an appropriate power control system (also not shown). An example of an appropriate power control system and source of pressurized hydraulic fluid is disclosed in Koenig U.S. Pat. No. 4,253,615, hereby incorporated by reference.

Figure 2:
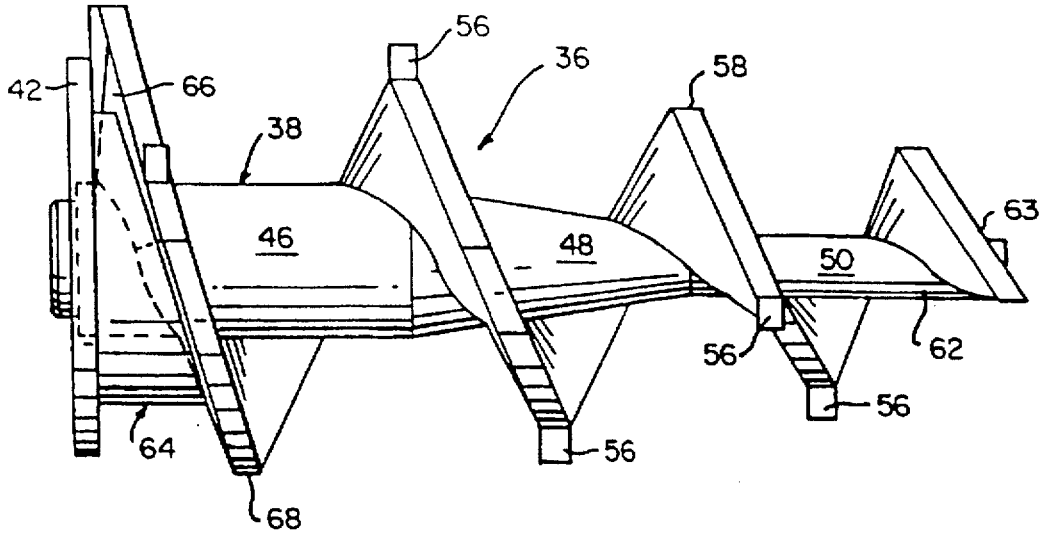
FIG. 2 is a side elevation of the tapered auger of the auger shredder of FIG. 1.
Figure 3:
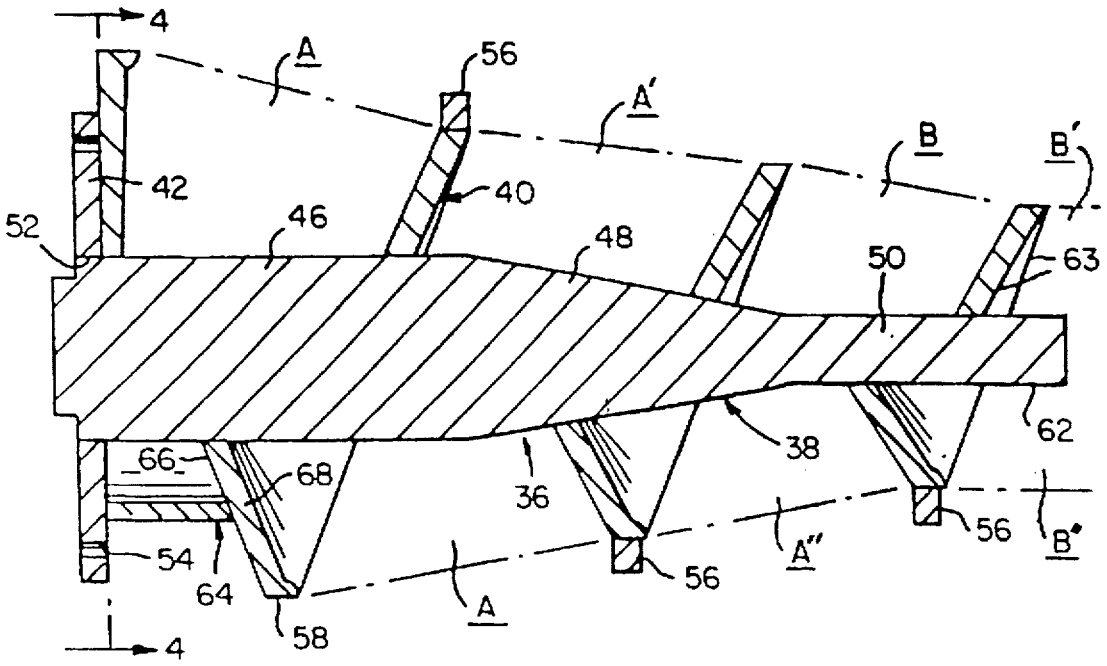
FIG. 3 is a side elevation in section of the tapered auger of FIG. 2.
Figure 4:
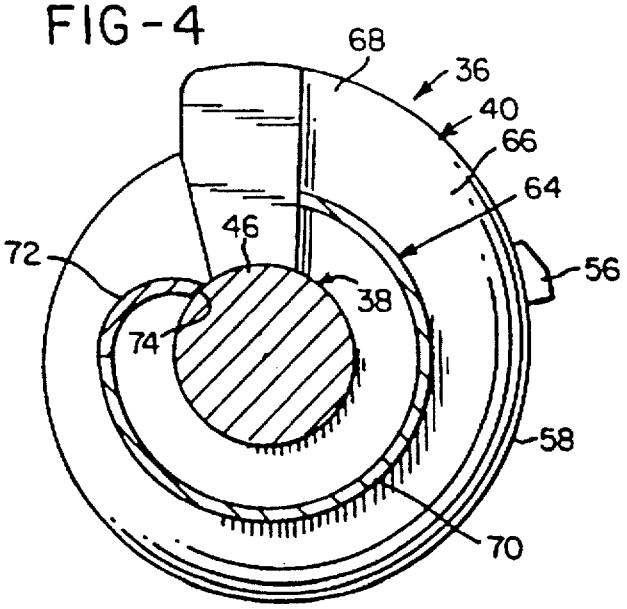
FIG. 4 is an end elevation in section of the tapered auger, taken at line 4—4 of FIG. 3.

As shown in FIGS. 2, 3 and 4, the shaft 38 of the auger screw 36 includes three components: a base portion 46, an intermediate conical portion 48 and an outer cylindrical portion 50. The base portion 46 extends through an opening 52 formed in the center of the base plate 42 and is secured thereto by welding. The base plate 42 includes a plurality of bolt holes 54 which receive bolts (not shown) for mounting the auger to a bearing disc (not shown) driven by the motor 44.

The flight 40 extends along the length of the shaft 38 and includes a plurality of radially projecting teeth 56 which extend outwardly from and are spaced along the outer periphery 58 of the flight. As shown in FIG. 1, the trough 22 includes a plurality of breaker bars 60 which extend inwardly from the trough and are spaced along the length of the trough to mesh with the teeth 56. Also shown in FIG. 1, the outer cylindrical portion 50 of the shaft 38 includes a segment 62 which extends into the extrusion tube 30.

The diameter of the flight 40 is tapered such that the volumes A, A', A" defined by the turns of the flight and portions of the shaft 38 associated with those turns (see FIG. 3) are substantially equal to each other along the length of the auger screw 36 within the grinding chamber 12. Thus, as the auger screw 36 is rotated by the motor 44, the pumping volumes A, A', A" of the flight 40 pump a substantially constant volume along the grinding chamber 20 to the discharge opening 24.

The segment 62 of the outer cylindrical portion 50 defines pumping volumes B, B', B" with the associated portion of the flight 40 which is reduced from the pumping volumes A, A', A" for the remainder of the auger screw 36. Consequently, once material has entered the extrusion tube 30, it is further compressed and shredded. Additional shredding is effected by action of the leading edge 63 of flight 40.

It should be noted that it is within the scope of the invention to provide a shaft 38 which is continuously tapered from the base plate 42 to the outer segment 62. However, the construction shown in the figures is preferred since it is less expensive to fabricate.

In an alternate embodiment, the intermediate portion 48 is sized to form a volumes A', A" which are progressively less than the volume A so that a volume reduction on the order or 2:1 to 4:1 occurs along the length of the grinding chamber 12. In addition, volumes B, and B" decrease at a greater ratio, by virtue of the cylindrical outer portion 50 combined with the associated portion of the flight 40. As shown in FIG. 1, this increased rate of reduction occurs substantially entirely in the extrusion tube 30.

As a result of adding the cylindrical outer portion 50 to the auger 36, the rate of compression can be increased in the extrusion tube 30 while maintaining a relatively low rate of compression in the grinding chamber 12. This not only prevents build up of material on the front wall but allows the grinding chamber to be made longer to accept larger objects to be shredded.

The auger screw 36 also includes a torque transmission collar 64 which extends between the base plate 42 and the rear surface 66 of the first turn 68 of the flight 40 (see FIGS. 2, 3 and 4). The torque transmission collar 64 is substantially cylindrical in shape and is dimensioned to contact the base plate 42 as close to the periphery of the base plate as possible.

As shown in FIG. 4, the collar 64 extends around substantially the entire periphery of the first flight 68. In a preferred embodiment, the collar 64 extends approximately 315° about the circumference of the first flight 68. The collar 64 is made up of two components: a first component 70 which extends semi-circumferentially about the first flight, and a second component 72 which has a reduced radius of curvature and curves inwardly to be attached to the shaft 38 along a longitudinal edge 74.

While the specific dimensions—such as thickness and diameter—will vary with respect to the diameters of the shaft and flight of the auger on which it is mounted, the collar must be sized to absorb more than one percent to approximately 15 percent of the overturning moment load transmitted to the auger 36 from the base plate 42, and more than one percent to approximately 20 percent of the torquional shock load transmitted to the auger from the base plate. If the collar 64 is sized to transmit less than the aforementioned values, there is a significant likelihood that, under high torque loads, the collar will shear from the base plate and/or first flight and, in severe situations, allow the shaft 38 to shear from the base plate or snap in two.

The operation of the tapered auger shredder is as follows. Prior to depositing material within the grinding chamber 12, the motor 44 is activated to begin rotation of the screw 36. The device shown in the figures is designed to operate at low speeds, preferably in the range of 1 to 30 revolutions per minute. Once the desired rotating speed of the auger 36 has been reached, material is dumped downwardly through the hopper extension 26 and into the grinding chamber 12. There, the material, which may be large, rigid objects such as pallets or 55 gallon oil drums of hardened material, is grabbed by the teeth 56 and pulled downwardly between the auger 36 and the side wall 20, where the material is crushed and shredded by the action of the screw flight 40 and the meshing of the teeth 56 with breaker bars 60.

The shredded material is pumped along the length of the grinding chamber by the flight 40 and, while there is some compression of material due to the tapered flight, this compression is minimized as a result of the constant pumping volume along the length of the grinding chamber. Once the material has progressed along the grinding chamber, it has been shredded and crushed sufficiently to enter the extrusion tube 30 where, as a result of the decreased pumping volume, it is compressed further and forms a plug 76 (FIG. 1) in the cylindrical segment of the tube. This plug of material is further reduced in particulate size by the shearing action of the leading edge 63 of the flight 40 as it rotates against the rear face of the plug. As a result of the constant pumping volume along the length of the grinding chamber 12, material is caused to flow more consistently, which reduces the likelihood of jamming or build up at the front wall 18, and requires less input energy by the motor 44.

The collar 64 provides a shield for the underside 66 of the first flight 68, thereby preventing jamming of material in the wedge-shaped void formed between the first flight and the base plate 42 and rear wall 16. Additionally, the collar 64 transmits torque to the first flight and shaft from the base plate 42, thereby reducing the stresses imparted to the base portion 46 of the shaft 38 by the base plate.

While the forms of apparatus herein described constitute preferred embodiments of this invention, it is to be understood that the invention is not limited to these precise forms of apparatus, and that changes may be made therein without departing from the scope of the invention.

What is claimed is:

1. An auger shredder comprising:

a frame defining a grinding chamber having an open top for receiving material to be shredded, front and rear walls joined by downwardly-converging side walls, said front wall having a substantially centrally-located discharge opening, and a trough positioned beneath said side walls and inclined upwardly to said discharge opening;

auger screw means for shredding material in said chamber and pumping said material through said discharge opening, said screw means having a shaft rotatably mounted ion said rear wall and extending through said grinding chamber to said discharge opening, said shaft tapering in diameter along its length from said rear wall to said front wall, and a helical flight extending along said shaft, said flight having an outer periphery which tapers in diameter from said rear wall to said front wall, said flight taper corresponding to said shaft taper such that a first series of volumes, each defined by a segment of said shaft and a turn of said flight adjacent to said segment, outwardly to a periphery of said flight turn, are substantially equal to each other along a substantial portion of said length of said shaft in said grinding chamber; and motor means for rotating said auger screw means, whereby compression of material by said screw means along said trough in said grinding chamber is substantially reduced to provide consistent flow of material to said discharge opening and reduce build-up of material at said discharge opening.

2. The auger shredder of claim 1 wherein said shaft includes a cylindrical base portion adjacent to said rear wall, an intermediate portion extending from said base portion and tapering in diameter from a diameter of said base portion, and an outer portion extending from said intermediate portion and having a diameter substantially equal to a diameter of an outer end of said intermediate portion.

3. The auger shredder of claim 1 wherein said grinding chamber includes an extrusion tube extending outwardly from said front all and communicating with said discharge opening; and said outer portion includes a segment extending into said extrusion tube past said front wall.

4. The auger shredder of claim 3 wherein said segment and a portion of said flight associated therewith define a second volume less than said first volume, whereby increased compression of material transported by said screw means occurs within said extension.

5. The auger shredder of claim 1 wherein said auger screw means is cantilevered from said rear wall and includes a disc-shaped base plate attached to a base portion of said shaft adjacent to said rear wall, said base plate being rotatably driven by said motor means.

6. The auger shredder of claim 3 wherein said auger screw means includes torque transmission collar means.

7. The auger shredder of claim 6 wherein said torque transmission collar means includes a wall extending lengthwise from said base plate directly to a rear surface of a first turn of said flight, and substantially about an entire circumference of said shaft.

8. The auger shredder of claim 7 wherein said torque transmission collar is sized to absorb from more than 1 percent to approximately 20 percent of a torsional shock load transmitted to said auger screw means by said motor means.

9. The auger shredder of claim 7 wherein said torque transmission collar is sized to absorb more than 1 percent to approximately 15 percent of an overturning moment load transmitted to said screw means by said motor means.

10. The auger shredder of claim 1 wherein said night decreases in pitch along its length toward said front wall.

11. The auger shredder of claim 1 wherein said night includes a plurality of teeth on and extending radially from a periphery thereof, spaced along a length thereof, and said trough includes a plurality of breaker bars spaced longitudinally and circumferentially thereof, and sized such that said teeth mesh with said bars as said auger screw means is rotated.

12. An auger shredder comprising:

a frame defining a grinding chamber having front and rear walls joined by downwardly-converging side walls, said fornt wall having a substantially centrally-located discharge opening, and a trough positioned beneath said side walls and inclined upwardly to said discharge opening;

auger screw means for shredding material in said chamber and pumping said material through said discharge opening, said screw means being cantilevered from said rear wall and having a disc-shaped base plate rotatably mounted on said rear wall, a shaft centrally mounted on said base plate and extending through said grinding chamber to said discharge opening, and a helical flight extending along said shaft and having a first turn attached to and extending from said base plate about a circumference of said shaft, said first turn having a rear surface facing said rear wall;

torque transmission collar means mounted on said base plate, attached directly to said rear surface of said first turn and extending substantially about an entire circumference of said shaft, for transmitting from said base plate more than 1 percent to approximately 15 percent of an overturning moment load, and more than 1 percent to approximately 20 percent of a torsional shock load to said first turn; and motor means for rotating said base plate and said screw.

13. The auger shredder of claim 12 wherein said collar means is substantially cylindrical in shape and is attached along a longitudinal edge to said shaft.

14. The auger shredder of claim 13 wherein said collar means extends approximately 315° about said shaft circumference.

15. The auger shredder of claim 13 wherein said collar means includes a first arcuate segment extending circumferentially about said shaft; and a second arcuate segment, having a radius of curvature less than that of said first segment and being attached to said shaft at said longitudinal edge.

16. The auger shredder of claim 12 wherein said collar means is attached to said base plate adjacent to an outer periphery thereof.

17. The auger shredder of claim 12 wherein said flight includes a plurality of teeth on and extending radially from a periphery thereof, spaced along a length thereof, and said trough includes a plurality of breaker bars spaced longitudinally and circumferentially thereof, and sized such that said teeth mesh with said bars as said auger screw means is rotated.

18. An auger shredder comprising:

a frame defining a grinding chamber having an open top for receiving material to be shredded, front and rear walls joined by downwardly-converging side walls, said front wall having a substantially centrally-located discharge opening, and a trough positioned beneath said side walls and inclined upwardly to said discharge opening;

an extrusion tube mounted on said front wall and extending outwardly from said grinding chamber, said tube being concentric with and communicating with said discharge opening;

auger screw means for shredding material in said chamber and pumping said material through said discharge opening, said screw means having a shaft rotatably mounted on said rear wall and extending through said grinding chamber and having a segment extending into said discharge opening, said shaft tapering along its length from said rear wall to said front wall, and a helical flight extending along said shaft and into said tube, said flight having an outer periphery which tapers in diameter from said rear wall to said front wall, said flight taper corresponding to said shaft taper such that a first series of pumping volumes, each defined by a segment of said shaft and a turn of said flight adjacent said segment outwardly to a periphery of said flight turn, are substantially equal to each other along a substantial portion of said length of said shaft in said grinding chamber, and another segment of said shaft and associated turn of said flight defines a second pumping volume, less than said first pumping volumes, in said tube; and motor means for rotating said auger screw, whereby compression of material by said screw means along said trough in said grinding chamber is substantially reduced to provide consistent flow of material to said discharge opening and reduce build-up of material at said discharge opening, and compression and particle size reduction of material occurs within said tube.

*19. For use with an auger shredder having, a frame defining a grinding chamber for receiving material to be shredded, front and rear walls joined by downwardly-converging side walls, said front wall having a substantially centrally-located discharge opening, and trough positioned beneath said side walls and inclined upwardly to said discharge opening and including a plurality of breaker bars extending radially inwardly therefrom, an auger screw for shredding material in said chamber and pumping said material through said discharge opening comprising:*

*a shaft adapted to be mounted on said rear wall and extend through said grinding chamber to said discharge opening;*

*and shaft tapering in diameter along its length from said rear wall to said front wall;*

*a helical flight extending along said shaft, said flight having an outer periphery which tapers in diameter from said rear wall to said front wall, said flight taper corresponding to said shaft taper such that a first series of volumes, each defined by a segment of said shaft and a turn of said flight adjacent to said segment, outwardly to a periphery of said flight turn, are substantially equal to each other along a substantial portion of said length of said shaft in said grinding chamber, so as to maintain a substantially constant volume along said length of said shaft;*

*said flight including a plurality of teeth on and extending radially from a periphery thereof, said teeth being spaced to mesh with said breaker bars when said auger screw is fixed in an axial direction; and a leading edge shaped to pump material through said discharge opening;*

*whereby rotation of said screw to pump materials along said trough minimizes compression of material and thereby provides consistent flow of material to said discharge opening of said associated grinding chamber.*

*20. The screw of claim 19 wherein said shaft includes a cylindrical base portion adjacent to said rear wall, an*

*intermediate portion extending from said base portion and tapering in diameter from a diameter of said base portion, and an outer portion extending from said intermediate portion and having a diameter substantially equal to a diameter of an outer end of said intermediate portion.*

*21. The screw of claim 20 wherein said outer portion includes a segment shaped to extend into an extrusion tube protruding forwardly from said front wall, and said segment and a portion of said flight associated therewith define a second volume less than said first volume, wherein increased compression of material transported by said screw occurs within said extension.*

*22. The screw of claim 19 wherein said screw is shaped to be cantilevered from said rear wall and includes base plate means attached to a base portion of said shaft adjacent to said rear wall, said base plate means being rotably driven by a rotation means.*

*23. The screw of claim 22 wherein said screw includes torque transmission collar means.*

*24. The screw of claim 23 wherein said torque transmission collar means includes a wall extending lengthwise from said base plate directly to a rear surface of a first turn of said flight, and substantially about an entire circumference of said shaft.*

*25. The screw of claim 24 wherein said torque transmission collar is sized to absorb from more than 1 percent to approximately 20 percent of a torsional shock load transmitted to said screw by said rotation means.*

*26. The screw of claim 25 wherein said torque transmission collar is sized to absorb more than 1 percent to approximately 15 percent of an overturning moment load transmitted to said screw by said rotation means.*

*27. The screw of claim 26 wherein said flight increases in pitch along its length toward said front wall.*

* * * * *